United States Patent

Burns

[15] 3,699,658
[45] Oct. 24, 1972

[54] BINNACLE
[72] Inventor: Harold S. Burns, Falmouth, Mass.
[73] Assignee: Electro Marine Corp.
[22] Filed: Oct. 30, 1970
[21] Appl. No.: 85,357

[52] U.S. Cl. ..........................33/346, 33/361, 33/364
[51] Int. Cl. ..............................................G01c 17/08
[58] Field of Search .33/223 R, 222 R, 225 R, 222 A, 33/224

[56] References Cited

FOREIGN PATENTS OR APPLICATIONS

| | | |
|---|---|---|
| 424,285 | 2/1935 | Great Britain ...........33/223 R |
| 450,652 | 7/1936 | Great Britain ...........33/222 R |
| 1,030,684 | 5/1966 | Great Britain ...........33/222 R |
| 251,921 | 5/1926 | Great Britain ...........33/223 R |
| 258,158 | 9/1926 | Great Britain ...........33/222 R |

Primary Examiner—Robert B. Hull
Attorney—Barlow & Barlow

[57] ABSTRACT

A binnacle is provided for mounting a compass which compass consists of a compass card mounted on a jeweled bearing and within a compass liquid in a first container, which in turn is gimballed in two directions (orthogonally) into the binnacle housing. The binnacle housing for the gimbal rings and the entire gimbal pivot as well as the compass housing is immersed in a compartment filled with a second fluid to provide damping for the compass bowl and the gimbal assembly.

1 Claim, 2 Drawing Figures

PATENTED OCT 24 1972

3,699,658

INVENTOR
HAROLD S. BURNS

BY
Barlow & Barlow
ATTORNEYS 3,699,658

BINNACLE

BACKGROUND OF THE INVENTION

It is very customary in marine compasses and compasses mounted on other vehicles to provide a standard compass of the liquid design. This design includes a compass bowl or housing which is filled with a liquid which normally consists of 50% alcohol and 50% water and within this bowl is a compass card graduated in degrees and mounted on a float in which is fitted a sapphire jewel. Magnets may be mounted on, in or under a float so that the card may turn in accordance with magnetic heading and a lubber's line is placed inside the bowl in the same plane as the compass card to indicate direction. A gimbal ring is pivoted on the compass bowl, the gimbal plane being that of the card with the center of gravity below the plane of the gimbal pivots so that the whole is pendulus. This arrangement maintains the bowl and card level even though the vessel may tilt as when pitching or rolling is encountered. There is an outer gimbal ring pivot provided which is then connected to the binnacle housing which acts not only as a protective mounting device for the compass bowl but also serves as a place to mount magnetic correctors and other devices such as Flinders bars. Several years ago an improvement was made in magnetic compasses by placing the card in its gimbals within a hollow sphere and using the compass fluid to dampen both the gimbal action along with the card. These are the compasses known as the spherical compasses that are popular today. The difficulty with this type of arrangement is that the period of the gimbals and bowl is still much shorter than that of the card which is due to the fact that we are dealing with two distinct types of masses with two different periods of oscillation when subject to the same damping fluid.

SUMMARY OF THE INVENTION

The present invention separates the two damping factors in a binnacle configuration so that the damping fluid surrounding the compass card is of low viscosity which is chosen to properly damp the compass card to normal specifications as, for example, when the compass card is deflected 40° and released it will only make 1 ½ full oscillations before it comes to rest. The compass bowl and gimbal ring assembly are then immersed in a second fluid of higher viscosity so that the tilt or deflection of the card and the compass bowl and gimbal ring assembly will be substantially the same. This becomes extremely important when the vessel is operating in heavy weather where in addition to the normal pitch and roll, the vessel and the compass binnacle is subject to lurching or non-cyclic forces for unless the damping of the card and bowl are similar, the fluid within the bowl will be in agitation which can cause perturbations of the card due to swirling of the fluid.

It will be appreciated that basically the compass bowl is a pendulum which tries to remain in a horizontal plane. However, in a ship with rolling action, acceleration forces are also present which make the pendulum seek a false vertical with pendulum, result that the compass card becomes tilted or other than horizontal. The compass card does not immediately tilt with the bowl because it is constrained by the damping fluid that encircles it and thus if an electromagnetic pickoff device is used mounted on the compass bowl, it can be seen that the electric signals that report the position of the compass card will be in error due to the fact that the compass card is tilted with respect to the bowl. With proper damping fluid the period of the bowl can be changed so as to eliminate any differential of tilt between the bowl and the card. In the present invention the bowl with its card and normal expansion diaphragm are contained in a fluid of optimum viscosity for the compass card, while outside of the bowl the bowl and the gimbals are immersed in a second fluid, the viscosity of which is optimized for its construction so that the period of the bowl and the gimbals can be matched to the period of the card when subject to acceleration forces.

DESCRIPTION OF THE PREFERRED EMBODIMENT

Figure 1:
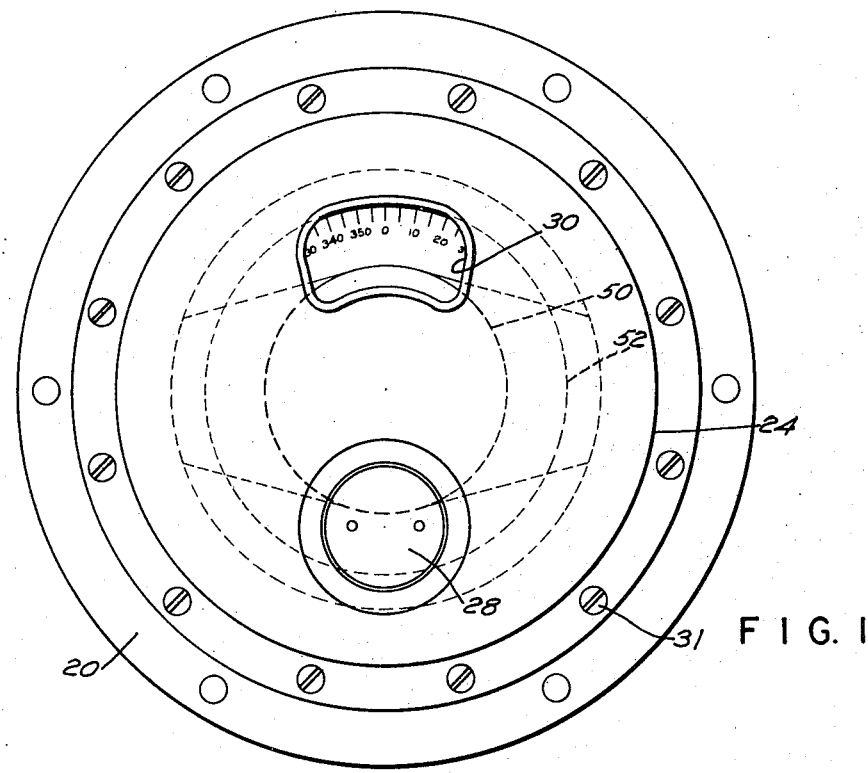
FIG. 1 is a top view of a binnacle in accordance with my invention.
Figure 2:
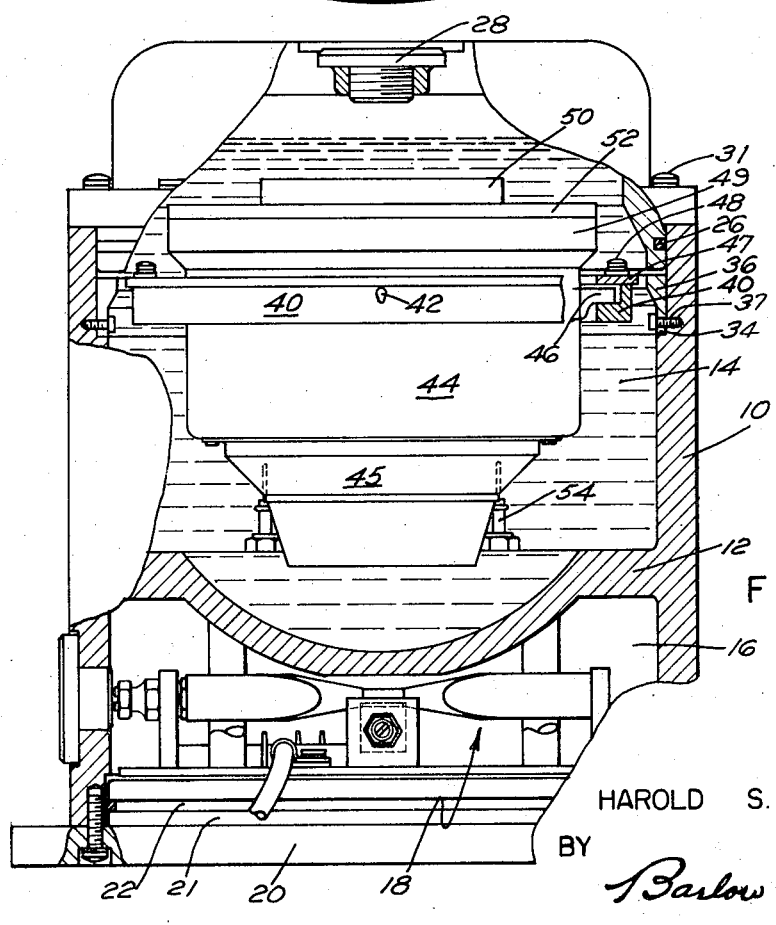
FIG. 2 is an elevational view thereof with parts broken away to show the interior thereof.

In the drawings there is shown a binnacle case 10 which is made from a high quality non-magnetic material and which is generally a cylinder in shape. The cylinder is divided into two compartments, there being a dividing wall 12 acting as the separator between the compartments to provide an upper compartment 14 and a lower compartment 16. The lower compartment 16 has mounted therein magnetic corrector devices generally designated 18 and is closed by a bottom plate 20 having an internal disc 21 provided with an O-ring 22 so as to tightly seal this bottom section. The upper section 14 is closed by a top cover 24 which has a portion thereof fitting within the cylindrical case 10 which is provided with an O-ring 26 for tight sealing engagement. The top cover 24 is provided with a filling plug 28 and a viewing window 30 and this entire assemblage is removably secured to the main binnacle cylindrical housing 10 by a plurality of fasteners 31.

Within the upper housing 14 the inner wall thereof is formed with a shelf as at 34 and on this shelf there rests an outer gimbal ring 36. The gimbal ring is fastened to the case 10 by screws 37 that are received in slots in the ring 36 and in this fashion the outer gimbal ring may be rotated relative to the case so as to provide proper correction for any misalignment of the entire binnacle case in respect of the fore and aft line of the ship. The outer binnacle ring 36 serves as a mounting for the inner binnacle ring 40 which is pivoted thereto by pivots 42 in a manner well known to those skilled in the art. The compass bowl 44 is provided with a pair of pivots 46 which are received on suitable pivot points within the gimbal ring 40, there being means such as a ring 47 and fasteners 48 that hold the pivots such as 42 and 46 in place, and prevent the same from being dislodged in violent sea action in a manner well known to those skilled in the art.

In some circumstances it may be practical to utilize a binnacle of this construction to provide electrical indication of the position of the magnet card, and to this end there may be mounted on the upper verge ring 49 and over the upper verge glass an electromagnetic pickoff coil 50 which may be fastened by a plate-like structure 52 to the upper verge ring 49. If this is done, then the electrical leads to this coil pickoff may pass through suitable bushings as, for example, at 54 and thence into the lower compartment and on to the device being supplied with the signal.

The compass bowl 44 contains the usual damping fluid which is confined by the verge ring and verge glass and the lower compass bowl assembly 45 which contains the usual pressure compensating bellows and diaphragm and suitable balance weights. The entire compass bowl and gimbal ring assembly is immersed in a second damping fluid within the upper case 14, which is not filled entirely to the top thereof to allow for expansion due to temperature changes. The type of fluid may be changed to meet the conditions generally set forth above but it has been found that in a particular application utilizing a U. S. Navy No. 3–5 inch compass, that a damping fluid in the range of 200 to 800 centistokes and ideally approximately 500 centistokes is suitable and damps the compass bowl and its gimbal ring to reduce the tilt due to acceleration to that of the tilt of the card in its own damping fluid and in turn, in the example where an electromagnetic pickoff device is used, help maintain the card and pickoff device in the same plane. If this condition is not met and the coil of the pickoff device and the magnets of the card are out of parallelism, errors in excess of 20° may be experienced on some headings. This is due to an asymetrical resultant field in the pickoff coil.

I claim:

1. A binnacle for a compass comprising a compartment in the binnacle formed by a bottom wall and a top wall means, a liquid filled compass having a compass card mounted in a compass bowl, said bowl having a gimbal ring pivotally attached thereto on a first pivot axis, said ring having a pivot on a second axis engaging fixed points on said compartment, said points being spaced well below the top wall to permit full tilting of the compass, said compartment filled with a second damping fluid completely immersing the compass bowl and gimbal ring assembly, the second damping fluid having a greater viscosity than the liquid in the compass bowl in the range of 200 to 800 centistokes to obtain substantially similar damping to the damping of the compass card and an electromagnetic pickoff device mounted in proximity to said compass card on said compass bowl.

* * * * *